Figure 1:
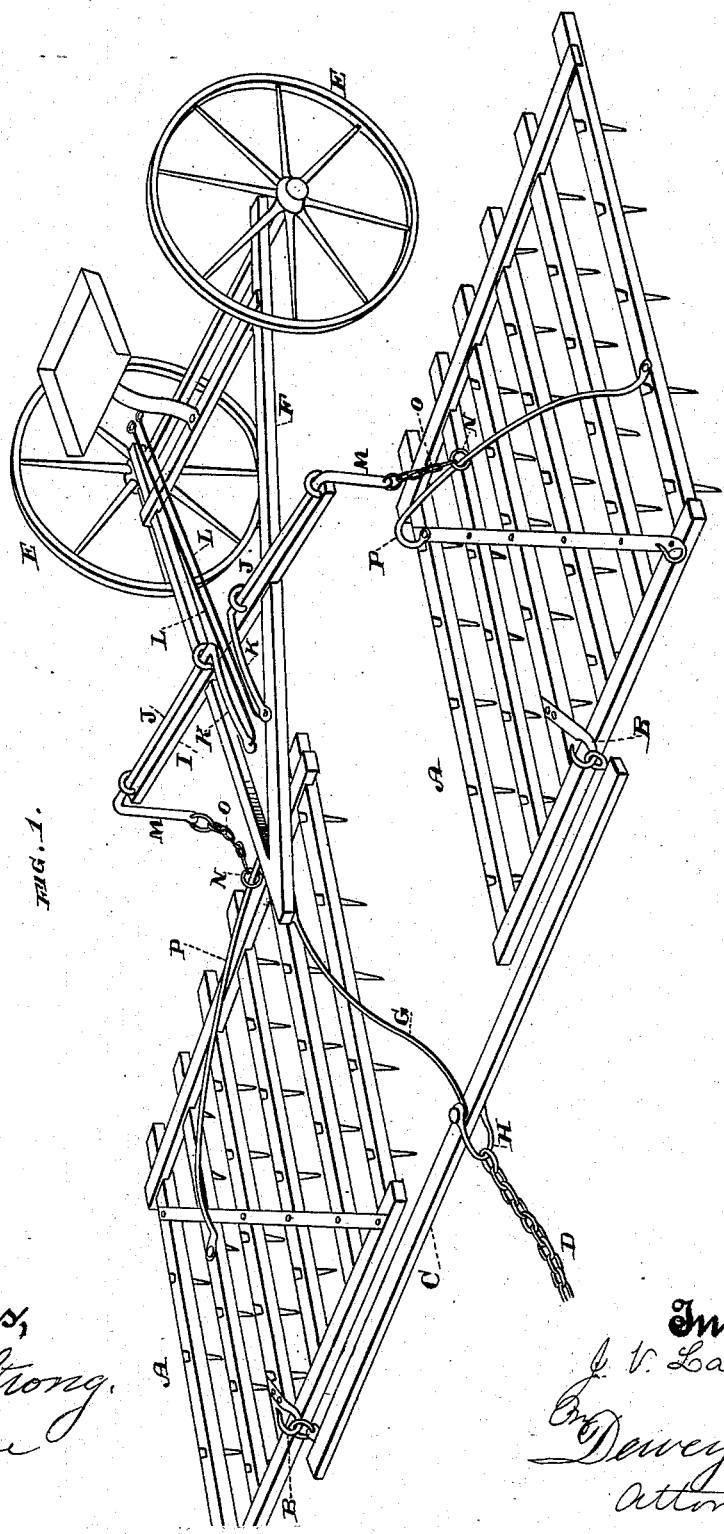

(No Model.)

2 Sheets—Sheet 1.

J. V. LACEY.
HARROW.

No. 284,309. Patented Sept. 4, 1883.

Witnesses,
Geo. H. Strong.

Inventor,
J. V. Lacey
Dewey & Co.
Attorneys

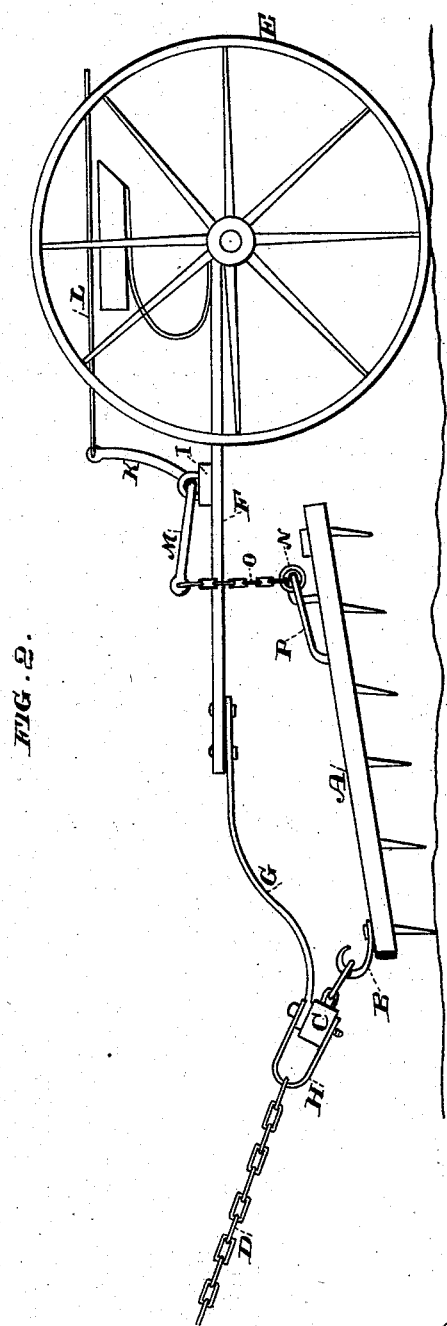

UNITED STATES PATENT OFFICE.

JOSEPH V. LACEY, OF SALINAS, CALIFORNIA.

HARROW.

SPECIFICATION forming part of Letters Patent No. 284,309, dated September 4, 1883.

Application filed February 17, 1883. (No model.)

*To all whom it may concern:*

Be it known that I, JOSEPH V. LACEY, of Salinas city, county of Monterey, State of California, have invented an Improved Harrow; and I hereby declare the following to be a full, clear, and exact description thereof.

My invention relates to certain improvements in harrows; and it consists of certain details of construction in a combination of one or more harrows with a sulky attachment, which follows the harrow and has a common attachment with the front of the harrows, so as to draw from the same point.

Referring to the accompanying drawings for a more complete explanation of my invention, Figure 1 is a view of my harrow and its attachments. Fig. 2 is a side elevation.

A A are harrows, which in the present case are each in form like a rhombus, and they have hooks B upon one side, to which a long bar, C, may be loosely attached by links or rings, as shown. A draft-chain, D, or doubletree is attached to the center of this bar, and the harrows are thus drawn side by side. Two sulky-wheels, E', support the rear of a frame, F, the front portion of which extends over the harrows, and has a curved bar, G, extending from the front end down to the clevis H upon the bar C, the clevis-pin passing through the bar, so that the draft upon the harrows and upon the sulky are both direct and independent of each other. A bar, I, is fixed across the frame F, at a point which will bring it above the rear portion of the harrows, and two cranked shafts, J, are journaled upon this bar. The crank-arms K at the inner ends of these shafts have each a rod, L, extending back to a point within easy reach of the driver, while the outer crank-arms, M, project at right angles with K, above the harrow-frames. Upon each of these harrow-frames a curved bar, P, has its ends bolted, the curved portions being slightly raised above the frames to receive a ring or traveler, N. These travelers are connected with the crank-arms M by chains O, so that the driver may raise either harrow by pulling upon one or the other of the rods L. This enables him to clean them from time to time of the trash which may become entangled in their teeth. These devices only raise the rear ends of the harrows directly; but while they are traveling the action of the draft will also raise the front end, so as to practically clear all the teeth.

The curved rods P, through which connection is made between the harrows and the crank-arms, allow the apparatus to be readily turned around, as the travelers will slide along these rods when a turn is to be made, and this will prevent cramping, and will allow the harrows and sulky to turn freely each in its own curve, without check.

Having thus described my invention, what I claim as new, and desire to secure by Letters Patent, is—

The harrows A, with their draft-bar C, and the sulky-frame F, extending above and connected with the draft-bar, as shown, in combination with the crank-shafts and arms K M, rods L, and the curved rods or bars P, to which the cranks M are connected by the chains and travelers, substantially as herein described.

In witness whereof I hereunto set my hand.

JOSEPH V. LACEY.

Witnesses:
S. H. NOURSE,
G. W. EMERSON.